(12) United States Patent
Yagi et al.

(10) Patent No.: US 6,709,354 B2
(45) Date of Patent: Mar. 23, 2004

(54) EXTRUDER DRIVING APPARATUS

(75) Inventors: Tatuo Yagi, Takasago (JP); Shoji Yoshimura, Takasago (JP); Katsunori Takahashi, Takasago (JP); Koichi Miyake, Takasago (JP); Koji Okuma, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 310 days.

(21) Appl. No.: 09/756,776

(22) Filed: Jan. 10, 2001

(65) Prior Publication Data
US 2001/0008372 A1 Jul. 19, 2001

(30) Foreign Application Priority Data

Jan. 14, 2000 (JP) ........................................ 2000-006997

(51) Int. Cl.[7] ............................................... F16H 3/72
(52) U.S. Cl. ............................................................ 475/6
(58) Field of Search ................................................ 475/6

(56) References Cited

U.S. PATENT DOCUMENTS 4,586,402 A * 5/1986 Schafer .......................... 475/6
6,106,426 A    8/2000 Morhard et al.

FOREIGN PATENT DOCUMENTS

| DE | 19736549 A1 * | 2/1999 |
| DE | 198 24 866 | 12/1999 |
| JP | 11-115035 | 4/1999 |

* cited by examiner

Primary Examiner—Dirk Wright
(74) Attorney, Agent, or Firm—Oblon, Spivak, McClelland, Maier & Neustadt, P.C.

(57) ABSTRACT

An extruder driving apparatus is provided in which a speed change gear mechanism is disposed in a position allowing the speed change gear mechanism to rotate at a much lower rotational speed, whereby a noise level is reduced and a seizing trouble is more surely avoided. The extruder driving apparatus comprises a main motor; a planetary gear mechanism including a torque input portion driven by the main motor and outputting a driving force after reducing a rotational speed of the main motor; an output distributing gear mechanism for distributing a driving force from an output portion of the planetary gear mechanism to a plurality of rotor drive shafts arranged parallel to each other; coupling units for connecting one ends of the rotor drive shafts to a plurality of rotors disposed on the extruder side; and thrust bearings for supporting the other ends of the rotor drive shafts to bear thrust forces imposed from the rotors. A speed change gear mechanism for adjusting a rotational speed of each rotor drive shaft through replacement of one pair of gears by another pair having a different gear ratio is provided between the planetary gear mechanism and the output distributing gear mechanism.

6 Claims, 4 Drawing Sheets

EXTRUDER DRIVING APPARATUS

BACKGROUND OF THE INVENTION

1. Field of the Invention

The present invention relates to an apparatus for driving an extruder that is typically represented by a twin continuous kneader for kneading high-molecular resin materials such as plastics and rubber.

2. Description of the Related Art

One known apparatus for driving a resin molding machine comprises a main motor; a planetary gear mechanism including a torque input portion driven by the main motor and an output portion for outputting a driving force after reducing a rotational speed (rpm) of the main motor; an output distributing gear mechanism for distributing the driving force from the output portion of the planetary gear mechanism to a plurality of rotor drive shafts arranged parallel to each other; coupling means for connecting one ends of the rotor drive shafts to a plurality of rotors on the extruder side; and thrust bearings for supporting the other ends of the rotor drive shafts to bear thrust forces from the rotors (see, for example, Japanese Unexamined Patent Application Publication No. 11-115035).

In such an extruder driving apparatus, the main motor is generally constituted by a motor rotating at a constant speed and having a large capacity for the necessity of driving the rotor drive shafts with a very large torque.

To meet a need of changing the number of poles of the main motor or changing the rotational speed of each rotor drive shaft depending on the specifications of extruders, therefore, a speed change gear mechanism (see gears 19 and 20 in the above-cited publication) is provided which enables one pair of gears to be replaced by another pair having a different gear ratio for adjustment of the rotational speed of each rotor drive shaft. The speed change gear mechanism is conventionally disposed between the main motor and the planetary gear mechanism.

However, when the speed change gear mechanism is disposed between the main motor and the planetary gear mechanism, the rotational speed of the speed change gear mechanism is equal to or greater than that of the main motor. This gives rise to a disadvantage that the circumferential speeds of teeth and bearings of gears as components of the speed change gear mechanism are necessarily increased and a noise level is increased.

Also, when the rotational speed of the speed change gear mechanism is equal to or greater than that of the main motor, the bearings for supporting the gears as components of the speed change gear mechanism are required to have a large load capacity for ensuring an improved useful life. This requirement however raises a problem that a seizing trouble is more likely to occur due to an increased value of d·n (d=bearing inner diameter, n=number of rotations).

The above-mentioned problems become more serious, particularly, in an extruder such as a biaxial continuous kneader, for which a scale-up has been keenly demanded in recent days, because a main motor must have larger power and rotate at a higher speed to satisfy such a demand.

SUMMARY OF THE INVENTION

In view of the state of the art set forth above, it is an object of the present invention to provide an extruder driving apparatus in which a speed change gear mechanism is disposed in a position allowing the speed change gear mechanism to rotate at a much lower rotational speed, whereby a noise level is reduced and a seizing trouble is more surely avoided.

To achieve the above object, the present invention is achieved with the following technical features.

An apparatus for driving an extruder, according to the present invention, comprises a main motor; a planetary gear mechanism driven by the main motor and outputting a driving force after reducing a rotational speed of the main motor; a speed change gear mechanism driven by an output of the planetary gear mechanism and outputting a driving force after adjusting an output rotational speed of the planetary gear mechanism; a plurality of rotor drive shafts arranged parallel to each other, each rotor drive shaft being provided at an end thereof on the extruder side with a coupling unit for connecting to a rotor; an output distributing gear mechanism driven by an output of the speed change gear mechanism and outputting a driving force to be distributed to the plurality of rotor drive shafts arranged parallel to each other; and a thrust bearing for supporting an end of each rotor drive shaft on the side opposite to the extruder.

In other words, the present invention provides an extruder driving apparatus mainly comprising a main motor, a planetary gear mechanism, an output distributing gear mechanism, coupling units for connection to rotors, and thrust bearings for bearing thrust forces imposed on rotor drive shafts, wherein a speed change gear mechanism for adjusting a rotational speed of each rotor drive shaft through replacement of one pair of gears by another pair having a different gear ratio is provided between the planetary gear mechanism and the output distributing gear mechanism.

With such an construction, since the speed change gear mechanism is disposed on the output side of the planetary gear mechanism, the rotational speed of each gear as a component of the speed change gear mechanism can be reduced down to a much lower value than that of the main motor (usually about ⅕ to ⅒ of the motor rpm).

Accordingly, the circumferential speeds of teeth and a bearing of each gear as a component of the speed change gear mechanism are also reduced and noise from the driving apparatus can be lessened to a level as low as possible. Further, since a value of d·n of the bearing supporting each gear is reduced, a risk of seizing of the bearing can be avoided to the utmost.

A planetary gear mechanism has a structure that a plurality of planetary gears are meshed with a sun gear. Therefore, the vector sum of gear meshing forces acting on the sun gear becomes substantially zero, and the sun gear is subjected to only torque and substantially no radial forces. Also, since the torque is evenly distributed to the plurality of planetary gears, the sun gear is not required to be supported by a bearing. Because of those structural features, when a main motor is directly coupled to a planetary gear mechanism as with the present invention, problems of high noise and seizing of a bearing do not occur with the planetary gear mechanism.

In trying to separately provide a rotational-speed adjusting mechanism in a gearing wherein a planetary gear mechanism serving as a main speed reducer and an output distributing gear mechanism serving as a load distributor are combined with each other, it is general knowledge to those skilled in the art that the speed change gear mechanism is disposed on the input side of the planetary gear mechanism like the related art, for the simple reason that such an arrangement reduces torque acting on gears of the added mechanism. By contrast, in the present invention, the novel advantages described above can be obtained by providing the speed change gear mechanism between the planetary gear mechanism and the output distributing gear mechanism contrary to the general knowledge.

More particularly, in the present invention, the speed change gear mechanism may comprise a driver gear directly coupled to an output shaft of the planetary gear mechanism, and a driven gear held in mesh with the driver gear and directly coupled to an end of one of the rotor drive shafts which penetrates through the thrust bearing and is further extended to the opposite side. In this type of the speed change gear mechanism, preferably, the driven gear is formed with helical gear acting to push the one rotor drive shaft back toward the rotor side.

The reason is as follows. By forming helical gear on the driven gear so as to push the rotor drive shaft back toward the rotor side, the load of a thrust bearing for supporting a thrust force imposed on the rotor drive shaft is reduced and a smaller thrust bearing can be employed. Consequently, the size and cost of the driving apparatus can reduced down to the smallest and lowest possible level.

In a mechanism wherein the planetary gear mechanism is directly connected to the output distributing gear mechanism like the related art, its specific structure impedes an attempt of mitigating a thrust force imposed on the rotor drive shaft, which is directly coupled to an output shaft of the planetary gear mechanism, by using the same means as used in the present invention. Usually, spur of herringbone (double helical) gears are employed in a planetary gear mechanism, and therefore a thrust force cannot be intentionally produced on an output shaft of the planetary gear mechanism. Further, when helical gears are employed in a planetary gear mechanism, the sum of thrust forces acting on planetary gears is zero and hence a thrust force imposed on an output shaft of the planetary gear mechanism is also zero.

From the structural point of view, it is also difficult to mitigate a thrust force imposed on a rotor drive shaft directly coupled to an output shaft of the preceding stage by using a thrust force generating mechanism that is added in the output distributing gear mechanism. When attempting to mitigate the thrust force imposed on the rotor drive shaft, it would be unavoidable that large thrust forces are produced in directions to act on individual distributing shafts of the output distributing gear mechanism. Such an attempt is therefore not preferable because of the necessity of employing bearings having a large load capacity or bearings dedicated for thrust forces in order to support the distributing shafts.

Further, when attempting to mitigate a thrust force imposed on another rotor drive shaft different from one, which is directly coupled to an output shaft of the preceding stage, by using a thrust force generating mechanism added in the output distributing gear mechanism, such an attempt produces a thrust force imposed on the rotor drive shaft, which is directly coupled to the output shaft of the preceding stage, in a direction to increase the thrust force. Accordingly, when the thrust force imposed on another rotor drive shaft different from one, which is directly coupled to the output shaft of the preceding stage, is mitigated by using the thrust force generating mechanism added in the output distributing gear mechanism, it would be essential to employ some means for mitigating the thrust force imposed on the rotor drive shaft which is directly coupled to the output shaft of the preceding stage. The arrangement of the related art for mitigating only the thrust force imposed on another rotor drive shaft different from one, which is directly coupled to the output shaft of the preceding stage, is not preferable.

Thus, only direct coupling between the speed change gear mechanism and the output distributing gear mechanism as employed in the present invention makes it possible to mitigate the thrust force imposed on the rotor drive shaft which is directly coupled to the output shaft of the preceding stage.

Further, the present invention preferably employs a planetary gear mechanism including a rotatable hollow gear that has internal gear provided on an inner circumference thereof to be meshed with all planetary gears and a second torque input portion provided on an outer circumference thereof. Also, preferably, a speed-variable auxiliary driving mechanism for applying a driving force separately from the main motor is connected to the second torque input portion of the hollow gear. With these features, each rotor drive shaft can be operated at a speed variable steplessly within the speed change range provided by the auxiliary driving mechanism.

In this connection, by arranging an axis of a pinion shaft of the auxiliary driving mechanism to be coincident with an axis of the rotor drive shaft directly coupled to the output shaft of the speed change gear mechanism, it becomes easier to bore holes through bearings for supporting the pinion shaft and the driven gear of the speed change gear mechanism. Further, by arranging an auxiliary motor for driving the auxiliary driving mechanism adjacent to the main motor on the same side with respect to the planetary gear mechanism, the driving apparatus can be made more compact in an overall width.

DESCRIPTION OF THE PREFERRED EMBODIMENTS

Preferred embodiments of the present invention will be described below with reference to the drawings.

Figure 1:
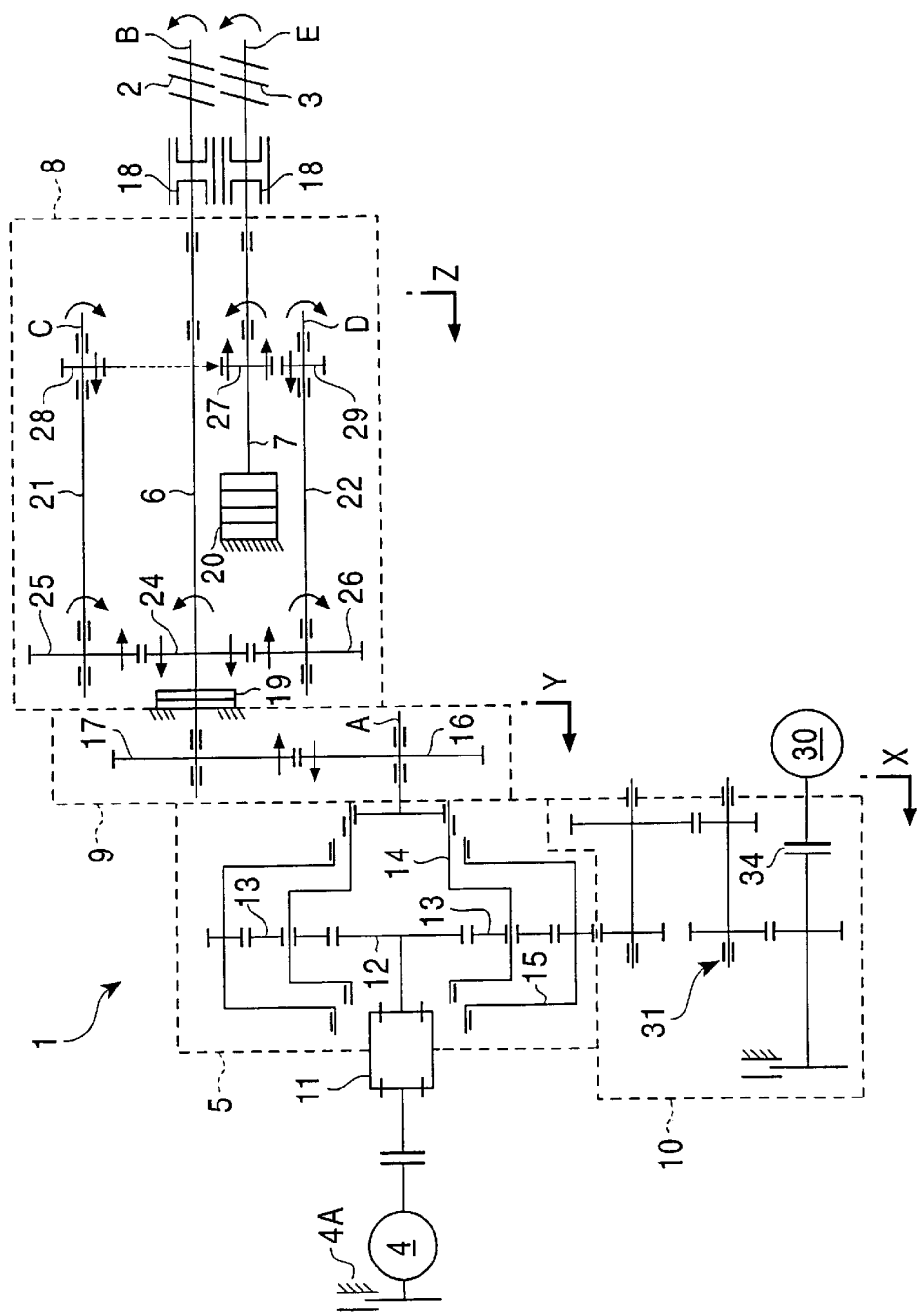
FIG. 1 is a diagram of the overall construction of a driving apparatus for a biaxial extruder according to a first embodiment of the present invention.

FIG. 1 shows the overall construction of an extruder driving apparatus 1 according to a first embodiment of the present invention.

As shown in FIG. 1, the driving apparatus 1 of this embodiment is intended to rotate a pair of left- and right-hand rotors 2, 3 of a biaxial extruder in the same direction. The driving apparatus 1 comprises a main motor 4; a planetary gear mechanism 5 including a torque input portion to which a drive shaft of the main motor 4 is connected; an output distributing gear mechanism 8 for distributing a driving force from an output portion of the planetary gear mechanism 5 to two first and second rotor drive shafts 6, 7 arranged parallel to each other; a speed change gear mechanism 9 provided between the planetary gear mechanism 5 and the output distributing gear mechanism 8; and a speed-variable auxiliary driving mechanism 10 for driving the planetary gear mechanism 5 in auxiliary fashion.

The drive shaft of the main motor 4 is connected to a sun gear 12 of the planetary gear mechanism 5 through a connecting coupler 11, and a brake 4A is provided on the opposite side of the main motor 4. The planetary gear mechanism 5 comprises the sun gear 12 that functions as a first torque input portion, three (or more) planetary gears 13 arranged around the sun gear 12, a carrier 14 for rotatably holding the planetary gears 13, and a hollow gear 15 having internal gear formed on its inner circumference to be meshed with all the planetary gears 13 and external gear formed on its outer circumference to function as a second torque input portion. The hollow gear 15 is rotatably supported to a gear case.

A bearing for supporting only a coupling weight is provided on a portion of the shaft between the main motor 4 and the connecting coupler 11 nearer to the planetary gear mechanism 5. Since a load is hardly imposed on that portion of the shaft, a bearing having a relatively small inner diameter d is enough to bear the load. Accordingly, a value of d·n is reduced and a risk of seizing is avoided.

The speed change gear mechanism 9 is to adjust a rotational speed of each rotor drive shaft 6, 7 by replacing one pair of gears by another pair having a different gear ratio. The speed change gear mechanism 9 comprises a driver gear 16 directly coupled to the carrier 14, which serves as an output portion of the planetary gear mechanism 5, through a coupler (not shown) in a concentric relation, and a driven gear 17 held in mesh with the driver gear 16. The driven gear 17 is directly coupled to an end of one of the two rotor drive shafts 6, 7 that constitute the output distributing gear mechanism 8 described below, i.e., to an end of the first rotor drive shaft 6 that is extended so as to penetrate through a first thrust bearing 19 and then reach the opposite side (left side in FIG. 1).

The output distributing gear mechanism 8 comprises the first rotor drive shaft 6, the second rotor drive shaft 7, and a pair of first and second distributing shafts 21, 22. The first rotor drive shaft 6 has a connecting unit (coupler) 18 provided at one end (right end in FIG. 1) for connection to the left-hand rotor 2, and is supported at the other end by the first thrust bearing 19. The second rotor drive shaft 7 has a connecting unit (coupler) 18 provided at one end (right end in FIG. 1) for connection to the right-hand rotor 3, and is supported at the other end by a second thrust bearing 20. The first and second (upper and lower) distributing shafts 21, 22 are arranged respectively above and below the two rotor drive shafts 6, 7.

Of those shafts 6, 21 and 22, the first rotor drive shaft 6 is provided with a first driver gear 24 mounted on the base end side. The first driver gear 24 is in mesh with both first and second distributing gears 25, 26 that are mounted respectively on the base end sides of the first and second distributing shafts 21, 22. Further, a second driver gear 27 is mounted on a central portion of the second rotor drive shaft 7. The second driver gear 27 is in mesh with first and second adding gears 28, 29 that are mounted respectively on the fore end sides of the first and second distributing shafts 21, 22.

The connecting couplers 18 serving as means for connection to the left- and right-hand rotors 2, 3 are provided at the one ends of the first and second rotor drive shafts 6, 7, and the first and second thrust bearings 19, 20 are provided at the other ends of the first and second rotor drive shafts 6, 7 for bearing thrust forces imposed from the respective rotors 2, 3. In addition, the other end of the first rotor drive shaft 6 is further extended toward the side of the planetary gear mechanism 5 (left side in FIG. 1) after penetrating through the first thrust bearing 19, and the driven gear 17 is fixed to the extended end of the first rotor drive shaft 6.

Figure 2A:
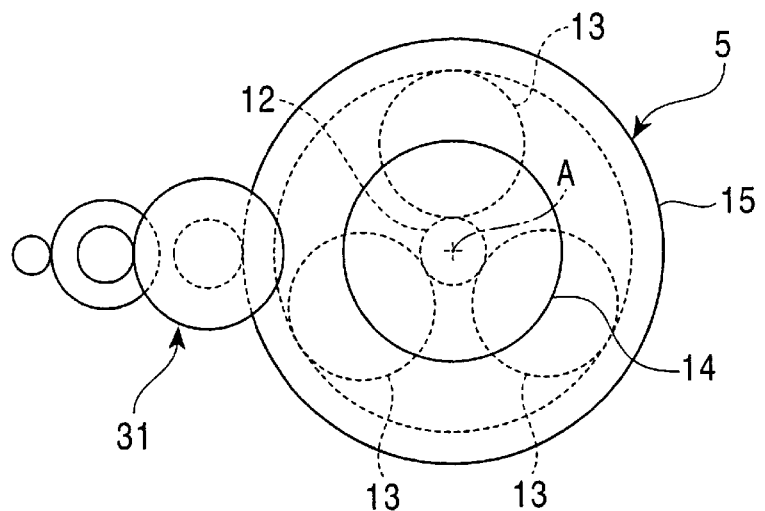
FIG. 2A is a representation of gear arrangement as viewed in an X-direction.
Figure 2B:
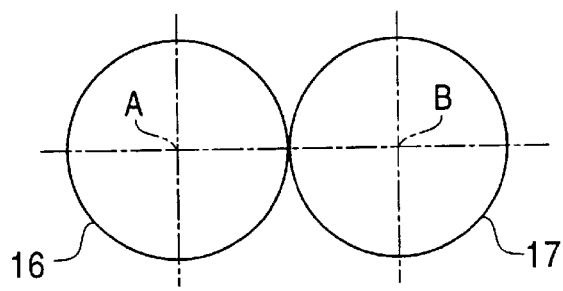
FIG. 2B is a representation of the gear arrangement of FIG. 1 as viewed in a Y-direction.

Note that, in FIGS. 1 and 2, A denotes the center of the planetary gear mechanism 5, B denotes the center of the first rotor drive shaft 6, C denotes the center of the first distributing shaft 21, D denotes the center of the second distributing shaft 22, and E denotes the center of the second rotor drive shaft 7. Also, in FIG. 1, the positional relationship between those shafts (particularly the shafts 7, 21 and 22) is shown developed into a plan view. Therefore, the first distributing shaft 21 is in fact located rightward of the first rotor drive shaft 6 and just above the second rotor drive shaft 7, but appears in FIG. 1 as if it is located leftward of (on the upper side in the drawing sheet of FIG. 1) the shaft 6.

Figure 2C:
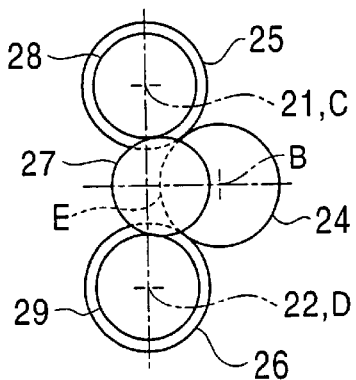
FIG. 2C is a representation of the gear arrangement of FIG. 1 as viewed in a Z-direction.

Stated otherwise, as shown in FIG. 2C, the first distributing shaft 21 is actually situated just above the second distributing shaft 22 with the second rotor drive shaft 7 interposed therebetween. Then, as indicated by a broken-line arrow in FIG. 1, the first adding gear 28 on the first distributing shaft 21 is meshed with the second drive gear 27 on the second rotor drive shaft 7.

Further, as indicated by horizontal arrows in FIG. 1, the gears 24 to 29 constituting the output distributing gear mechanism 8 have helical gear formed so as to cancel thrust forces imposed on both the distributing shafts 21, 22 and to mitigate the burden imposed on the second thrust bearing 20.

More specifically, the first distributing gear 25 on the first distributing shaft 21 has helical gear formed to generate a thrust force acting rightward in the drawing, and the first adding gear 28 on the same shaft 21 has helical gear formed to generate a thrust force acting leftward in the drawing. As a result, the thrust forces imposed on the first distributing shaft 21 are canceled.

Also, the second distributing gear 26 on the second distributing shaft 22 has helical gear formed to generate a thrust force acting rightward in the drawing, and the second adding gear 29 on the same shaft 22 has helical gear formed to generate a thrust force acting leftward in the drawing. As a result, the thrust forces imposed on the second distributing shaft 22 are canceled.

Further, the second driver gear 27 held in mesh with the first and second adding gears 28, 29 is subjected, as a result of reaction to the thrust forces imposed on both the adding gears 28, 29, to a thrust force acting rightward in the drawing to push the second rotor drive shaft 7 back toward the side of the rotor 3. Consequently, the burden imposed on the second thrust bearing 20 is mitigated.

On the other hand, the first driver gear 24 held in mesh with the first and second distributing gears 25, 26 is subjected, as a result of reaction to the thrust forces imposed on both the distributing gears 25, 26, to a thrust force acting leftward in the drawing to push the first rotor drive shaft 6 toward the side opposite to the rotor 2. For this reason, if such an arrangement is practically employed as it is, the burden imposed on the first thrust bearing 19 would be increased because of the thrust force from the first driver gear 24 being imposed in addition to the thrust force from the rotor 2.

Taking into consideration the above problem, in this embodiment, the driven gear 17 of the speed change gear mechanism 9 is fixed to the extended end of the first rotor drive shaft 6 having penetrated through the first thrust bearing 19, and it is formed to have helical gear for generating a thrust force acting to push the first rotor drive shaft 6 back toward the side of the rotor 2. As a result, the burden imposed on the first thrust bearing 19 is mitigated to a level as low as possible.

The speed-variable auxiliary driving mechanism 10 comprises a variable-speed auxiliary motor 30 and multiple stages of speed reducing gears 31 for transmitting a rotational speed of the auxiliary motor 30 after reduction. A final gear of the multiple stages of speed reducing gears 31 is meshed with the external gear of the hollow gear 15 of the planetary gear mechanism 5. In the driving apparatus 1 of this embodiment, therefore, each rotor drive shaft 6, 7 can be operated not only at a constant speed by the main motor 4, but also at a speed variable steplessly within the speed change range provided by the speed-variable auxiliary driving mechanism 10.

Additionally, a drive shaft of the auxiliary motor 30 and a gear shaft of the first stage are connected to each other through a joint 34 having a torque limiter (overtorque detecting) function, so that an overtorque state of an output shaft can be detected in any rotational speed range.

With the driving apparatus 1 having the construction described above, since the speed change gear mechanism 9 for adjusting a rotational speed of each rotor drive shaft 6, 7 through replacement of one pair of gears by another pair having a different gear ratio is disposed on the output side of the planetary gear mechanism 5, the rotational speed of each gear 16, 17 as a component of the speed change gear mechanism 9 can be reduced down to a much lower value than that of the main motor 4.

Accordingly, the circumferential speeds of teeth and bearings of the gears 16, 17 as components of the speed change gear mechanism 9 are also reduced and noise can be lessened to a level as low as possible. Further, since a value of d·n of the bearing supporting each gear 16, 17 is reduced, a risk of seizing of the bearing can be avoided to the utmost.

It should be noted that the present invention is not limited to the above-described embodiment, but it may be practiced with various modifications in design.

Figure 3A:
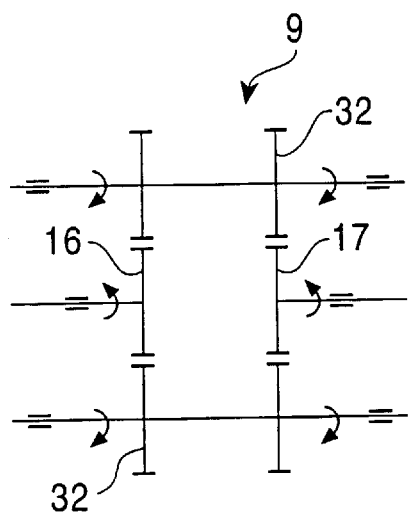
FIG. 3A is a representation of gear arrangement of a speed change gear mechanism, which employs idler gears, as viewed from side.
Figure 3B:
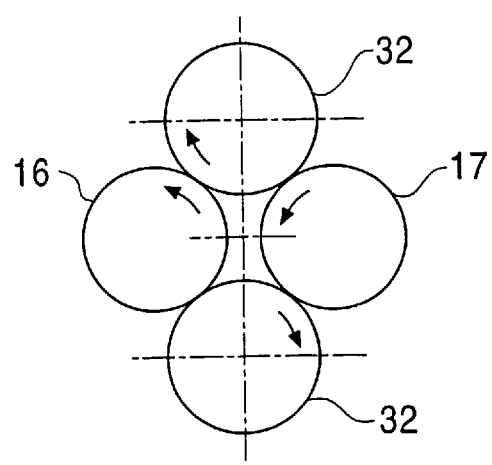
FIG. 3B is a representation of the gear arrangement of FIG. 3A as viewed from the left side on the drawing sheet of FIG. 3A.

For example, as shown in FIGS. 3A and 3B, the driver gear 16 and the driven gear 17, which constitute the speed change gear mechanism 9, may be connected to each other through idler gears 32 for torque transmission rather than being directly meshed with each other. In this case, since the diameter of each gear 16, 17 and the size of a bearing for each gear can be further reduced, it is possible to more effectively prevent the occurrence of noise and a seizing trouble of the bearings.

Figure 3C:
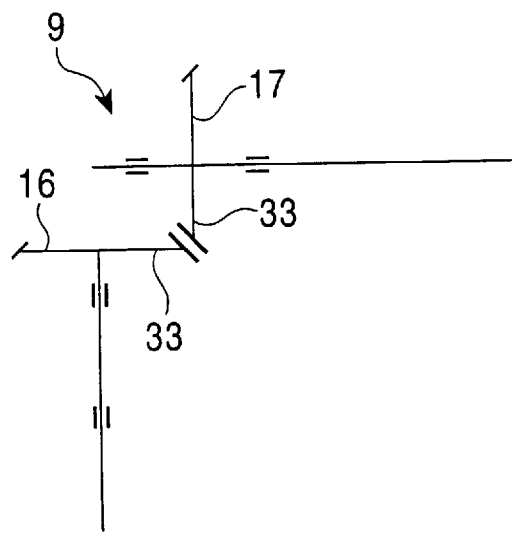
FIG. 3C is a representation of gear arrangement of a speed change gear mechanism, which employs bevel gears, as viewed from above.

Alternatively, as shown in FIG. 3C, the driver gear 16 and the driven gear 17 may be constituted by bevel gears 33 meshing with each other in an orthogonal relation.

Further, the output distributing gear mechanism 8 in FIG. 1 is illustrated just for the purpose of showing one example, and may be practiced with various modifications in design other than the illustrated distributing and adding arrangement. For example, the present invention is also applicable to a mechanism including three or more rotor drive shafts, or an output distributing gear mechanism in which a pair of left and right rotor drive shafts are rotated in different directions.

While the planetary gear mechanism 5 is shown in FIG. 1 as including only one planetary gear, it may include two or more planetary gears arranged in tandem. In this case, a speed change gear mechanism may be provided not only on the output side of a final planetary gear whose rotational speed is reduced down to the lowest level, but also on the output side of at least a first planetary gear.

Figure 4:
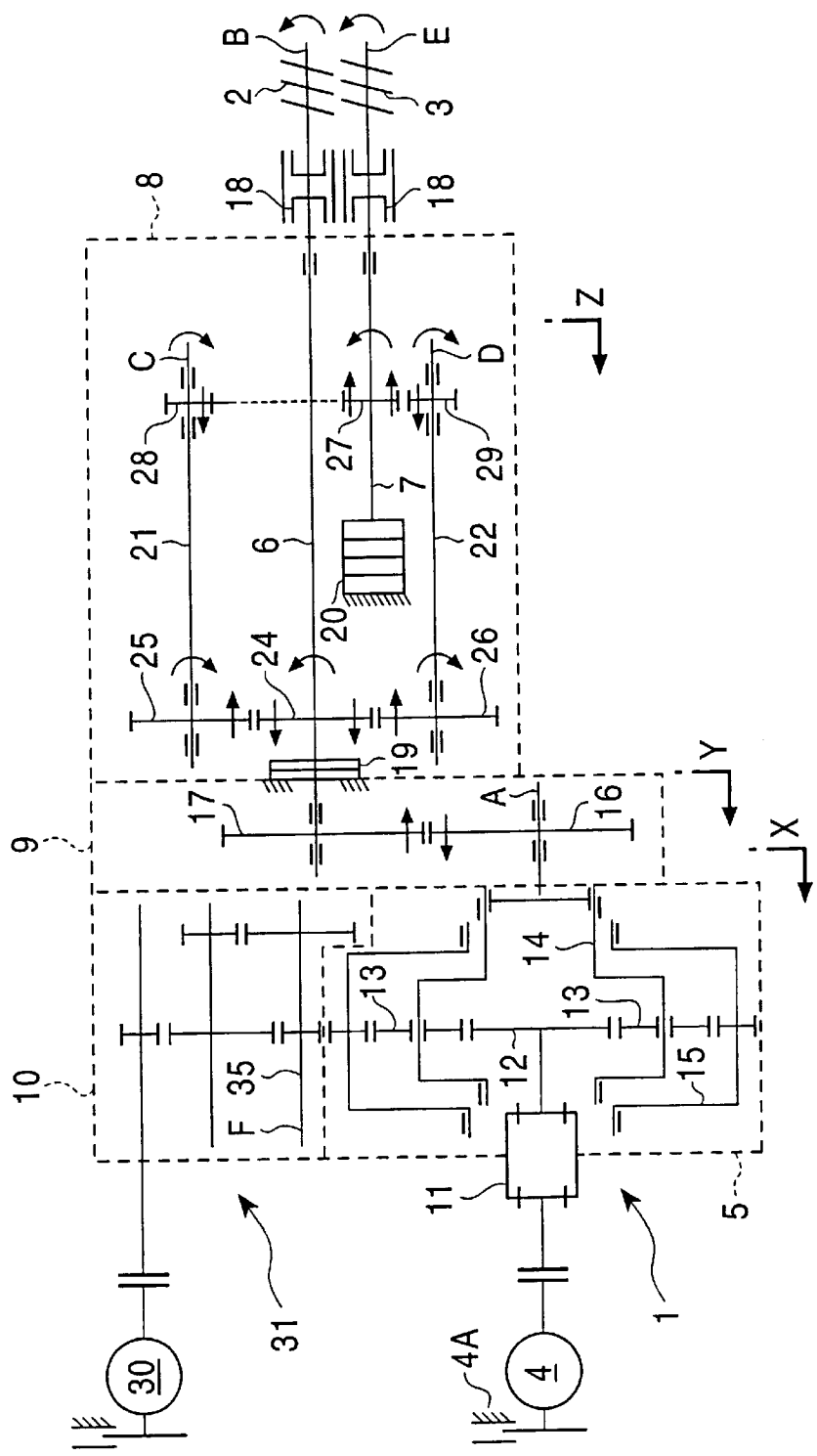
FIG. 4 is a diagram of the overall construction of a driving apparatus for a biaxial extruder according to a second embodiment of the present invention.

FIG. 4 shows a second embodiment of the present invention.

The second embodiment differs from the first embodiment of FIG. 1 in that the auxiliary motor 30 is arranged on the left side of the main motor 4 in parallel as viewed from above and an axis F of a pinion shaft 35 of the auxiliary driving mechanism 10 is arranged in coincidence with the axis B of the first rotor drive shaft 6.

Such an arrangement of this embodiment is advantageous in that, since the auxiliary motor 30 is arranged on the left side of the main motor 4, the driving apparatus can be made more compact in an overall width than that having the arrangement of the first embodiment (FIG. 1). Stated otherwise, a gear case housing the planetary gear mechanism 5, the speed change gear mechanism 9 and the auxiliary driving mechanism 10 has a one-piece structure capable of being split into upper and lower halves. By arranging the auxiliary motor 30 on the left side of the main motor 4, the gear case can be formed to have a plan shape closer to a rectangle. Consequently, the width of the gear case can be reduced.

Another advantage of this embodiment is that the axis F of the pinion shaft 35 of the auxiliary driving mechanism 10 is coincident with the axis B of the first rotor drive shaft 6, it becomes easier to bore a hole through a bearing for supporting the pinion shaft 35 and a hole through a bearing for supporting the shaft of the driven gear 17.

The axis F of the pinion shaft 35 of the auxiliary driving mechanism 10 can be made coincident with the axis B of the first rotor drive shaft 6 by adjusting specifications of the driver gear 16, the driven gear 17, and a pair of small and large gears of the third stage among the multiple stages of speed reducing gears 31 in the auxiliary driving mechanism 10.

Note that, since the remaining construction of the second embodiment is the same as that of the first embodiment, identical components are denoted by the same numerals in FIG. 4 and a detailed description is omitted here.

What is claimed is:

1. An apparatus for driving an extruder, comprising:
    a main motor;
    a planetary gear mechanism directly driven by said main motor and outputting a driving force after reducing a rotational speed of said main motor;
    a pair of exchangeable meshing gears which may be exchanged to provide a desired speed ratio, driven by an output of said planetary gear mechanism and outputting a driving force after adjusting an output rotational speed of said planetary gear mechanism;
    a plurality of rotor drive shafts arranged parallel to each other, each said rotor drive shaft being provided at an end thereof on the extruder side with a coupling unit for connecting to a rotor;
    an output distributing gear mechanism driven by an output of said meshing gears and outputting a driving force to be distributed to said plurality of rotor drive shafts arranged parallel to each other; and
    a thrust bearing for supporting an end of each said rotor drive shaft on the side opposite to the extruder.

2. The apparatus for driving an extruder according to claim 1, wherein one of said plurality of rotor drive shafts penetrates through said thrust bearing and is directly coupled to an output shaft of said pair of meshing gears.

3. The apparatus for driving an extruder according to claim 2, wherein said pair of meshing gears comprises a driver gear coupled to an output shaft of said planetary gear mechanism, and a driven gear directly coupled to an end of said one rotor drive shaft which is directly coupled to the output shaft of said pair of meshing gears, said driven gear having beveled teeth acting to push said one rotor drive shaft, which is directly coupled to the output shaft of said pair of meshing gears, toward the rotor side.

4. The apparatus for driving an extruder according to claim 1, wherein said planetary gear mechanism includes a rotatable hollow gear, said hollow gear having internal teeth provided on an inner circumference thereof to be meshed with all planetary gears and a second torque input portion provided on an outer circumference thereof, and an auxiliary driving mechanism for applying a driving force to said planetary gear mechanism separately from said main motor is connected to said second torque input portion.

5. The apparatus for driving an extruder according to claim 4, wherein an axis of a pinion shaft of said auxiliary driving mechanism is coincident with an axis of said one rotor drive shaft which is directly coupled to the output shaft of said pair of meshing gears.

6. The apparatus for driving an extruder according to claim 5, wherein an auxiliary motor for driving said auxiliary driving mechanism is disposed on the same side as said main motor with respect to said planetary gear mechanism.

* * * * *